United States Patent
Kobayashi et al.

(10) Patent No.: US 10,953,498 B2
(45) Date of Patent: Mar. 23, 2021

(54) METHOD OF WELDING LAMINATED METAL FOILS

(71) Applicant: TOYOTA JIDOSHA KABUSHIKI KAISHA, Toyota (JP)

(72) Inventors: Hiroomi Kobayashi, Okazaki (JP); Nozomi Tateyama, Okazaki (JP); Keisuke Uchida, Nagoya (JP); Fuminori Ohashi, Nagoya (JP); Yoshinori Shibata, Nagoya (JP); Masaki Koike, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 15/984,955

(22) Filed: May 21, 2018

(65) Prior Publication Data
US 2018/0361516 A1    Dec. 20, 2018

(30) Foreign Application Priority Data

Jun. 20, 2017    (JP) .............................. JP2017-120723

(51) Int. Cl.
  *B23K 33/00*    (2006.01)
  *B23K 26/035*   (2014.01)
  (Continued)

(52) U.S. Cl.
  CPC .......... *B23K 33/002* (2013.01); *B23K 9/1274* (2013.01); *B23K 11/185* (2013.01);
  (Continued)

(58) Field of Classification Search
  CPC .............. B23K 11/185; B23K 2101/36; B23K 2103/10; B23K 2103/12; B23K 2103/166;
  (Continued)

(56) References Cited

U.S. PATENT DOCUMENTS

| 1,951,470 A | * | 3/1934 | Cole ...................... B21D 49/00 |
| | | | 29/506 |
| 2,707,889 A | * | 5/1955 | Sowter .................. B23K 20/02 |
| | | | 228/115 |

(Continued)

FOREIGN PATENT DOCUMENTS

| JP | 2004-58141 A | 2/2004 |
| JP | 2004273178 A | 9/2004 |

(Continued)

OTHER PUBLICATIONS

Kawahito Yousuke, et al., "Adaptive Control and Repair for Lap Welds of Aluminum Alloy Sheets Based upon In-Process Monitoring", Transactions of JWRI, vol. 34, No. 2, Jan. 2005, p. 7-15 (10 Pages Total).

*Primary Examiner* — Thien S Tran
(74) *Attorney, Agent, or Firm* — Sughrue Mion, PLLC

(57) ABSTRACT

Provided is a method of welding laminated metal foils that can prevent blowholes and spatter from being formed. It is a method of welding laminated metal foils sandwiched between a pair of metal plates to the pair of metal plates. The method of welding laminated metal foils sandwiched between a pair of metal plates to the pair of metal plates includes locally pressing and crimping the laminated metal foils sandwiched between the pair of metal plates at a welding point in a laminating direction, and welding the crimped pair of metal plates and laminated metal foils at the welding point.

3 Claims, 9 Drawing Sheets

(51) Int. Cl.
  *B23K 35/02* (2006.01)
  *B23K 9/127* (2006.01)
  *B23K 11/18* (2006.01)
  *B23K 26/03* (2006.01)
  *B23K 26/22* (2006.01)
  *B23K 26/60* (2014.01)
  *H01M 2/26* (2006.01)
  *B23K 103/10* (2006.01)
  *B23K 103/12* (2006.01)
  *B23K 101/36* (2006.01)
  *B23K 103/16* (2006.01)

(52) U.S. Cl.
  CPC .......... *B23K 26/032* (2013.01); *B23K 26/037* (2015.10); *B23K 26/22* (2013.01); *B23K 26/60* (2015.10); *B23K 35/0238* (2013.01); *H01M 2/266* (2013.01); *B23K 2101/36* (2018.08); *B23K 2103/10* (2018.08); *B23K 2103/12* (2018.08); *B23K 2103/166* (2018.08); *H01M 2/26* (2013.01)

(58) Field of Classification Search
  CPC .... B23K 26/032; B23K 26/037; B23K 26/22; B23K 26/60; B23K 33/002; B23K 35/0238; B23K 9/1274; H01M 2/26; H01M 2/266
  USPC .............................. 219/617, 121.62, 121.64
  See application file for complete search history.

(56) References Cited

U.S. PATENT DOCUMENTS 8,245,396 B2 * 8/2012 Kondo ................ H01R 4/62
  29/863
2015/0136840 A1 5/2015 Zhao et al.

FOREIGN PATENT DOCUMENTS

| | | |
|---|---|---|
| JP | 2014-136242 A | 7/2014 |
| JP | 2014-140890 A | 8/2014 |
| JP | 2015-005456 A | 1/2015 |
| JP | 2015-136731 A | 7/2015 |
| KR | 10-2013-0120267 A | 11/2013 |
| KR | 10-2014-0087985 A | 7/2014 |

* cited by examiner

METHOD OF WELDING LAMINATED METAL FOILS

CROSS REFERENCE TO RELATED APPLICATIONS

This application is based upon and claims the benefit of priority from Japanese patent application No. 2017-120723, filed on Jun. 20, 2017, the disclosure of which is incorporated herein in its entirety by reference.

BACKGROUND

The present disclosure relates to a method of welding laminated metal foils, and more particularly to a method of welding laminated metal foils sandwiched between a pair of metal plates.

For example, secondary batteries and capacitors collect current by laminated metal foils for electrodes bonded to a metal plate for current collection. Normally, laminated metal foils and a metal plate made of aluminum or copper having excellent conductivity are bonded by welding (metallurgical bonding) or mechanical bonding. When welding is used in this case, electrical resistance after the bonding can be reduced as compared with mechanical bonding.

Japanese Unexamined Patent Application Publication No. 2014-136242 discloses a method of laser welding laminated metal foils to a projection formed on a metal plate while pressing the laminated metal foils against an upper surface of the projection of the metal plate. Specifically, the laminated metal foils are pressed against the upper surface of the projection by pressing a periphery of the projection with an annular pressing member from above the laminated metal foils placed on the metal plate. In this manner, the metal foils in the laminated metal foils or the laminated metal foils and the metal plate are brought into close contact with each other, thereby more effectively preventing welding defects such as blowholes from being formed during welding.

SUMMARY

The inventors have found the following problems relating to a method of welding laminated metal foils.

In the method of welding laminated metal foils disclosed in Japanese Unexamined Patent Application Publication No. 2014-136242, the force of pressing the laminated metal foils against the upper surface of the projection is weak, and thus microscopic gaps are formed between the laminated metal foils. That is, although the laminated metal foils are macroscopically laminated without gaps, microscopically, gaps are formed between the laminated metal foils. This method still has a problem that due to the microscopic gaps between the metal foils, blowholes are formed during welding, and spatter occurs when the blowholes burst. The blowholes may remain in a welded part and adversely affects the fatigue strength, contact resistance, etc. of the welded part, and the spatter may adhere to and be mixed in the welded part as a foreign object to cause an adverse effect.

The method of welding laminated metal foils disclosed in Japanese Unexamined Patent Application Publication No. 2014-136242 has another problem in which a temperature of the metal foil on the surface could sharply increase because the laminated metal foils are directly irradiated with a laser beam to be welded, allowing spatter to easily occur. Such a problem can be avoided by placing another metal plate on the laminated metal foils, so that the laminated metal foils are sandwiched by a pair of metal plates to be welded.

However, the blowholes and the spatter caused by the above-mentioned microscopic gaps between the metal foils cannot be prevented from being formed only by the pair of metal plates sandwiching the laminated metal foils.

Such blowholes and spatter can be formed not only in laser welding but also in resistance welding and other welding.

The present disclosure has been made in view of such circumstances. The present disclosure is to provide a method of welding laminated metal foils that can more effectively prevent blowholes and spatter from being formed.

An example aspect of the present disclosure is a method of welding laminated metal foils sandwiched between a pair of metal plates to the pair of metal plates. The method includes:

locally pressing and crimping the laminated metal foils sandwiched between the pair of metal plates at a welding point in a laminating direction; and welding the crimped pair of metal plates and laminated metal foils at the welding point.

In the method of welding laminated metal foils according to the example aspect of the present disclosure, the laminated metal foils sandwiched between the pair of metal plates are locally pressed and crimped at a welding point in the laminating direction.

Such a configuration reduces the number of microscopic gaps between the metal foils in the laminated metal foils and microscopic gaps between the laminated metal foils and the metal plates and, thereby more effectively preventing blowholes and spatter from being formed during welding.

In the crimping, a thickness of the crimped laminated metal foils is made 50% or less of a thickness of the laminated metal foils before being crimped.

Such a configuration more effectively prevents blowholes and spatter from being formed during welding more reliably.

In the crimping, the welding point is irradiated with a laser beam to be welded.

Such a configuration can easily remove a lubricant adhering to the welding point in the crimping step.

In the welding, an irradiation condition of the laser beam is feedback-controlled based on intensity of thermal radiation light emitted from a molten pool formed by the irradiation of the laser beam.

Such a configuration can improve quality of the welded part.

In the welding, contact of the molten pool with a base on which the pair of metal plates and the laminated metal foils are placed is detected based on the intensity of the thermal radiation light, and when the contact of the molten pool with the base is detected, the irradiation of the molten pool with the laser beam is ended.

Such a configuration can more effectively prevent burn-through caused by swelling of the molten pool.

The present disclosure can provide a method of welding laminated metal foils that can more effectively prevent blowholes and spatter from being formed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. In order to clarify the descriptions, the following descriptions and drawings are simplified as appropriate.

First Embodiment

<Structure of Welded Laminated Metal Foils>

First, laminated metal foils welded by a method of welding laminated metal foils according to a first embodiment will be described with reference to FIGS. 1 and 2.

Figure 1:
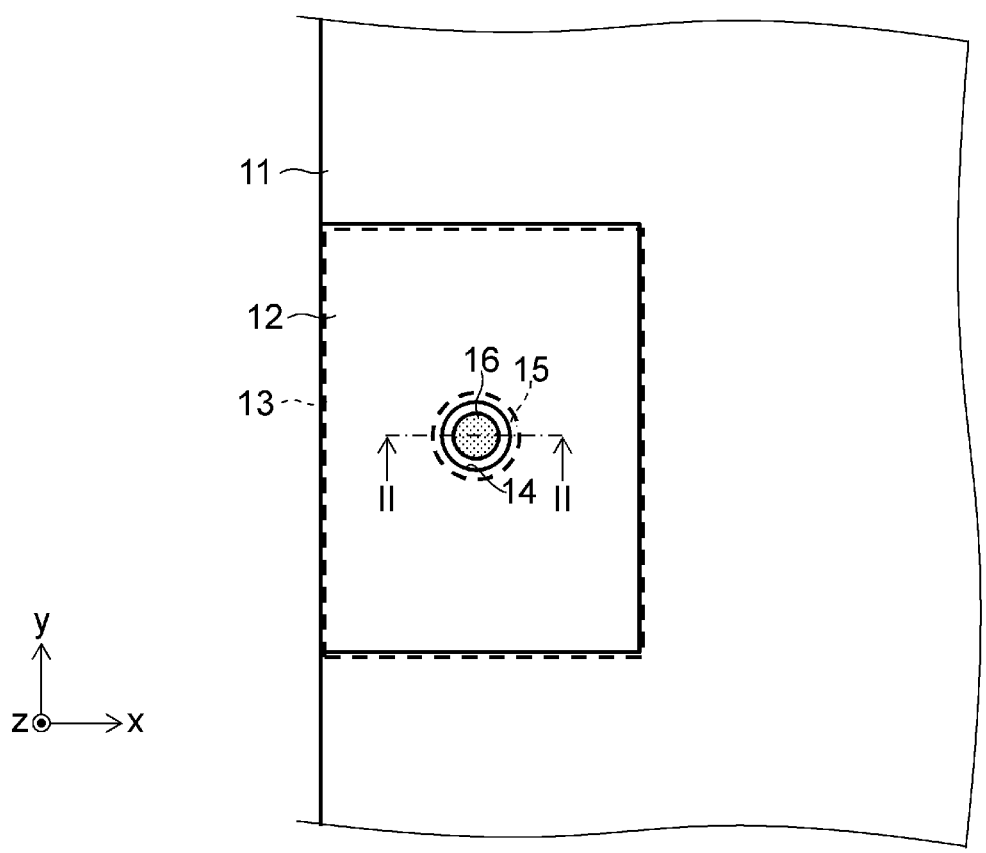
FIG. 1 is a plan view of laminated metal foils welded by a method of welding laminated metal foils according to a first embodiment.

FIG. 1 is a plan view of laminated metal foils welded by the method of welding laminated metal foils according to the first embodiment. FIG. 2 is a cross-sectional view taken along the line II-II of FIG. 1. As shown in FIGS. 1 and 2, laminated metal foils 11 are sandwiched between a pair of metal plates 12 and 13 and welded to the metal plates 12 and 13 at a welded part 16.

It is obvious that right-handed xyz orthogonal coordinates shown in FIG. 1 and other drawings are merely for convenience of describing the positional relationship of the components. Normally, a z-axis positive direction is vertically upward and a xy plane is a horizontal plane, which are common to the drawings. In FIG. 1, the metal plates 12 and 13 actually overlap each other, although they are drawn offset from each other for easier understanding.

The laminated metal foils 11 are formed by laminating metal foils extending from an electrode (a positive electrode or negative electrode) in, for example, a secondary battery, a capacitor, etc. The laminated metal foils 11 are formed by laminating about 30 to 100 metal foils each having a thickness of, for example, about 10 to 30 µm. The laminated metal foils 11 are preferably made of a metal material having high conductivity such as aluminum, copper, or an alloy containing them as a main component.

As shown in FIG. 1, a part of a periphery of the laminated metal foils 11 is sandwiched between the pair of metal plates 12 and 13 for current collection. In other words, the laminated metal foils 11 are bundled macroscopically without gaps by the metal plates 12 and 13. Each of the metal plates 12 and 13 has a rectangular shape in a xy plane view, and has a thickness of, for example, about 1 to 1.5 mm. In terms of weldability and electrical resistance of the welded part 16, the metal plates 12 and 13 are preferably made of the same kind of a metal material as that of the laminated metal foils 11. Specifically, when the laminated metal foils 11 are made of aluminum, the metal plates 12 and 13 are also preferably made of aluminum. When the laminated metal foils 11 are made of copper, the metal plates 12 and 13 are also preferably made of copper.

Figure 2:
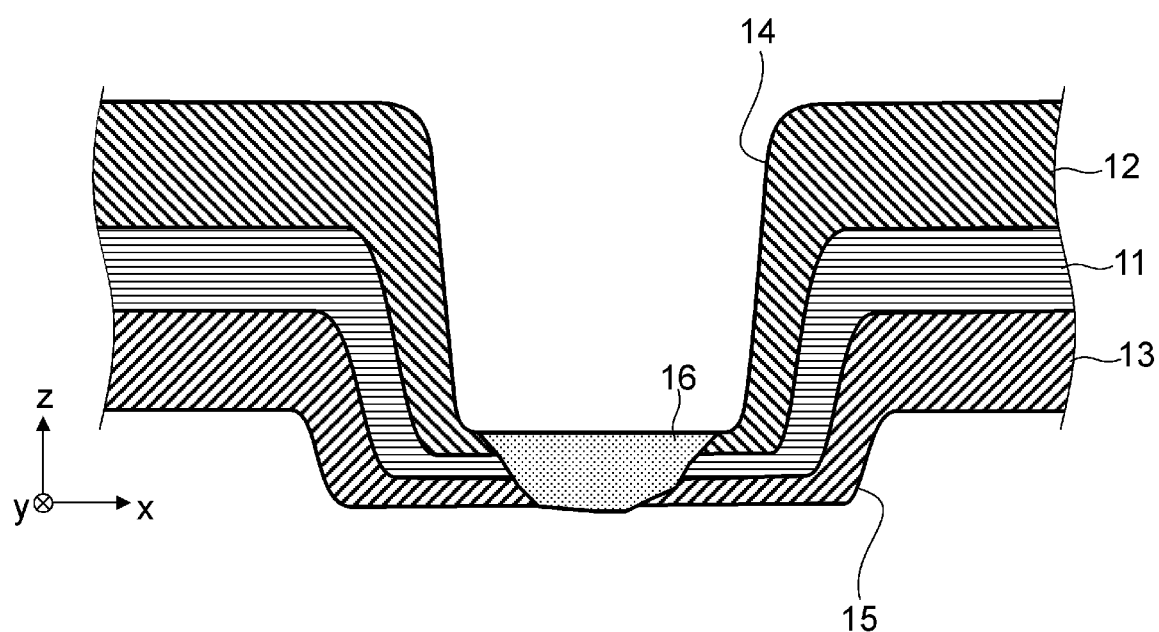
FIG. 2 is a cross-sectional view taken along the line II-II of FIG. 1.

As shown in FIG. 2, at the welded part 16, all the metal foils constituting the laminated metal foils 11 are welded to each other, and the laminated metal foils 11 are welded to the metal plates 12 and 13. In the example of FIG. 2, the welded part 16 penetrates through a rear surface. That is, the welded part 16 is formed from a bottom surface of a recess 14 (a surface of the recess 14 on the z axis positive direction side) formed in the metal plate 12 to a top surface of a projection 15 (a surface of the projection 15 on the z axis negative direction side) formed in the metal plate 13. The recess 14 and the projection 15 are formed before welding the laminated metal foils 11 to the metal plates 12 and 13, i.e., before forming the welded part 16. Further, the recess 14 and the projection 15 are formed by locally pressing and crimping the laminated metal foils 11 sandwiched between the pair of metal plates 12 and 13 in the laminating direction (z-axis direction) at a welding point where the welded part 16 is to be formed.

As shown in FIGS. 1 and 2, the recess 14 is a cylindrical depression formed in the upper surface of the metal plate 12 (the main surface of the metal plate 12 on the z axis positive direction side). The projection 15 is a disc-shaped protrusion projecting downward (the z-axis negative direction) from a lower surface of the metal plate 13 (the main surface of the metal plate 13 on the z-axis negative direction side) on a lower side of the recess 14 (the z-axis negative direction side). As will be described later in detail, the recess 14 and the projection 15 are formed by crimping processing for pushing a punch downward (the z-axis negative direction) from the upper surface of the metal plate 12.

As shown in FIG. 2, the laminated metal foils 11 and the metal plates 12 and 13 are deformed into a U-shaped cross section between the recess 14 and the projection 15 that are formed by the crimping processing. The laminated metal foils 11 and the metal plates 12 and 13 are compressed and deformed between the bottom surface of the recess 14 and the top surface of the projection 15. A thickness of the laminated metal foils 11 between the bottom surface of the recess 14 and the top surface of the projection 15 is preferably 50% or less of the thickness of a non-crimped area, namely, the laminated metal foils 11 before it is crimped.

As described above, in the laminated metal foils 11 welded by the method of welding laminated metal foils according to the first embodiment, the welding point is crimped before being welded, so that the laminated metal foils 11 and the metal plates 12 and 13 are compressed and deformed. Thus, there are a small number of microscopic gaps between the metal foils in the laminated metal foils 11 and a small number of microscopic gaps between the laminated metal foils 11 and the metal plates 12 and 13. This more effectively prevents blowholes and spatter from being formed during welding.

Further, the metal foils of the laminated metal foils 11 are welded, and the laminated metal foils 11 and the metal plates 12 and 13 are welded. Thus, the laminated metal foils 11 welded by the method of welding laminated metal foils according to the first embodiment has less electrical resistance after the bonding and improved fatigue strength as compared with the case where only mechanical bonding is used.

<Method of Welding Laminated Metal Foils>

Figure 3:
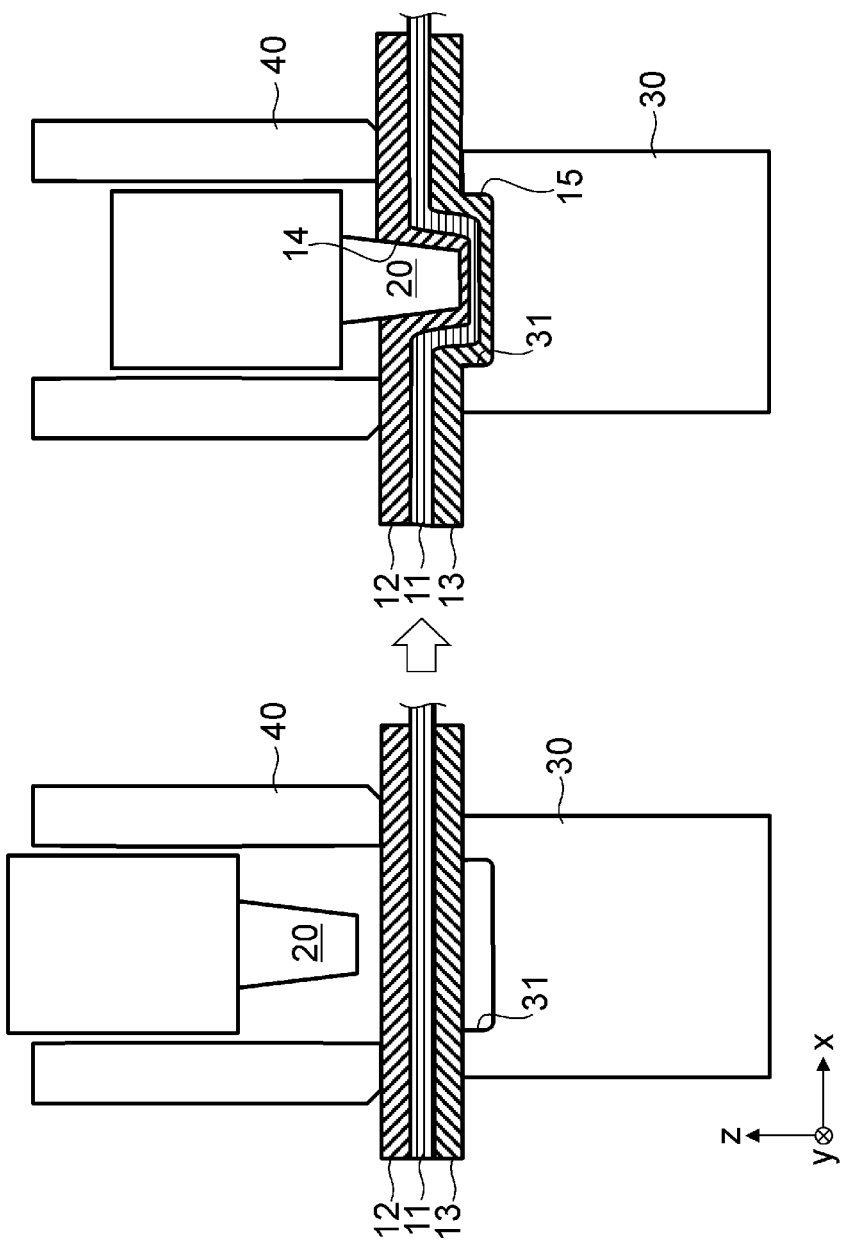
FIG. 3 is a cross-sectional view showing a crimping step in the method of welding laminated metal foils according to the first embodiment.
Figure 4:
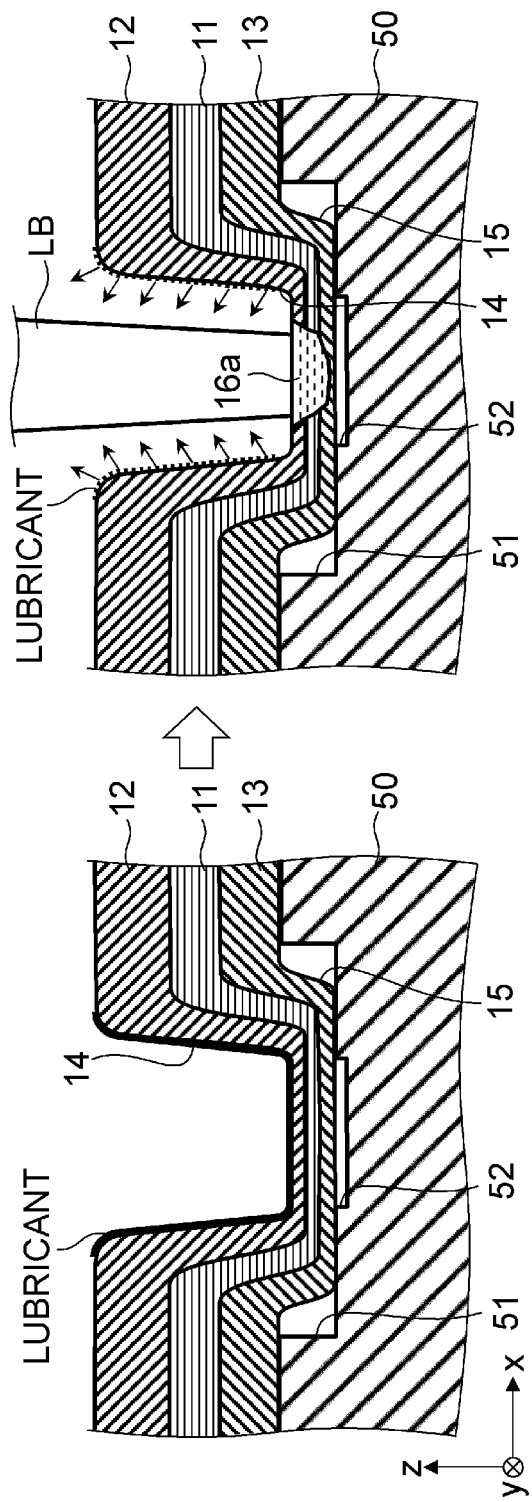
FIG. 4 is a cross-sectional view showing a welding step in the method of welding laminated metal foils according to the first embodiment.

Next, the method of welding laminated metal foils according to this embodiment will be described with reference to FIGS. 3 and 4. FIG. 3 is a cross-sectional view showing a crimping step in the method of welding laminated metal foils according to the first embodiment. FIG. 4 is a cross-sectional view showing a welding step in the method of welding laminated metal foils according to the first embodiment.

First, the crimping step in the method of welding laminated metal foils according to this embodiment will be described with reference to FIG. 3.

As shown in FIG. 3, the laminated metal foils 11 sandwiched between the pair of metal plates 12 and 13 are locally pressed and crimped at the welding point in the laminating direction. FIG. 3 shows a mechanical bonding method called mechanical clinching using deep drawing, as an example of the crimping processing method for locally pressing the laminated metal foils 11 in the laminating direction. A crimping processing apparatus shown in FIG. 3 includes a punch 20, a die 30, and a stripper 40.

Specifically, as shown in the left drawing of FIG. 3, the metal plate 12 is positioned on the upper side (the z-axis positive direction side), the metal plate 13 is positioned on the lower side (the z-axis negative direction side), and then the laminated metal foils 11 are placed on an upper surface of the die 30 (a surface of the die 30 on the z axis positive direction side). Then, a periphery of the welding point to be pressed by the punch 20 is pressed from above the metal plate 12 by the stripper 40. That is, the laminated metal foils 11 are sandwiched by the metal plate 13 placed on the die 30 and the metal plate 12 pressed by the stripper 40. Then, a recess 31 depressed in a disk shape is formed in the upper surface of the die 30.

Next, as shown in the right drawing of FIG. 3, the punch 20 is pushed downward (the z-axis negative direction) from the upper surface of the metal plate 12. Then, the recess 14 depressed in a cylindrical shape corresponding to the shape of the punch 20 is formed in the upper surface of the metal plate 12 at the welding point. At the same time, the laminated metal foils 11 and the metal plates 12 and 13 pressed by the punch 20 are pushed into the recess 31 of the die 30, and the disc-shaped projection 15 corresponding to the shape of the recess 31 is formed in the lower surface of the metal plate 13 at the welding point.

In other words, as shown in the right drawing of FIG. 3, in the crimping step, the laminated metal foils 11 and the metal plates 12 and 13 are deformed into a U-shaped cross section between the punch 20 and the recess 31 of the die 30. The laminated metal foils 11 and the metal plates 12 and 13 are compressed and deformed between a distal end surface of the punch 20 and a bottom surface of the recess 31 of the die 30. The thickness of the compressed and deformed laminated metal foils 11 shown in the right drawing of FIG. 3 is preferably 50% or less of the thickness of the laminated metal foils 11 before it is compressed and deformed shown in the left drawing of FIG. 3.

In this embodiment, mechanical clinching is employed as the crimping processing method. However, it is not particularly limited to this as long as it is a crimping processing method for locally pressing the laminated metal foils 11 in the laminating direction. For example, the upper surface of the die 30 may be flat, and the crimping processing method may only include locally pressing the laminated metal foils 11 sandwiched between the pair of metal plates 12 and 13 by the punch 20.

In this embodiment, the die 30 and the punch 20 are not heated. However, the die 30 and the punch 20 may be heated to make the laminated metal foils 11 and the metal plates 12 and 13 easy to deform.

Next, the welding step in the method of welding laminated metal foils according to this embodiment will be described with reference to FIG. 4.

As shown in FIG. 4, the laminated metal foils 11 and the metal plates 12 and 13 crimped at the welding point are welded at the welding point. FIG. 4 shows laser welding as an example of the welding method.

Specifically, as shown in the left drawing of FIG. 4, the metal plate 12 is positioned on the upper side (the z-axis positive direction side), the metal plate 13 is positioned on the lower side (the z axis negative direction side), and then the laminated metal foils 11 are placed on a base 50. A first recess 51 for accommodating the projection 15 formed in the crimping step is formed in an upper surface of the base 50 that supports the lower surface of the metal plate 13. Further, a second recess 52 is formed at a central part of the bottom surface of the first recess 51. Each of the first recess 51 and the second recess 52 is, for example, a disk-shaped depression.

Further, as shown in the left drawing of FIG. 4, a volatile lubricant applied to the punch 20 adheres to the surface of the recess 14 formed in the crimping step.

Figure 5:
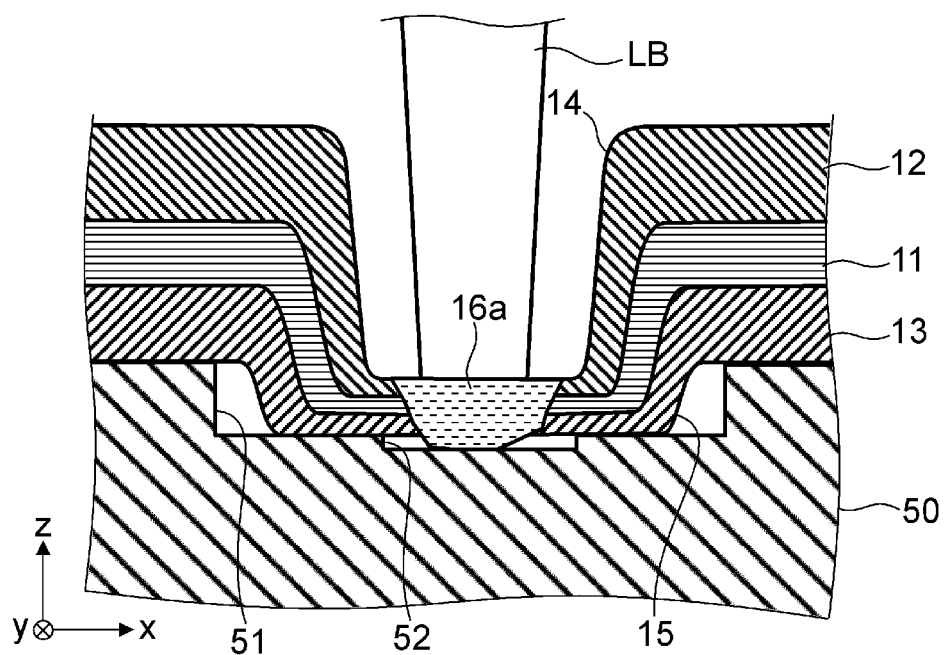
FIG. 5 is a cross-sectional view showing a state where a molten pool 16a penetrates through a rear surface in the welding step and the molten pool 16a is brought into contact with a second recess 52 of a base 50.

Next, as shown in the right drawing of FIG. 4, the bottom surface of the recess 14 formed in the crimping step is irradiated with a laser beam LB from above (the z-axis positive direction side). The above-mentioned second recess 52 is formed so that it is positioned right under a molten pool 16a formed by the irradiation of the laser beam LB. As will be described in detail later, by detecting the contact of the molten pool 16a with the second recess 52, burn-through caused by swelling of the molten pool 16a can be more effectively prevented. FIG. 5 is a cross-sectional view showing a state in which the molten pool 16a penetrates through the rear surface in the welding step, and the molten pool 16a comes into contact with the second recess 52 of the base 50.

On the other hand, as shown in the right drawing of FIG. 4, the lubricant adhering to the surface of the recess 14 can be volatilized by irradiating the bottom surface of the recess 14 with the laser beam LB.

In this embodiment, laser welding is employed as the welding method, but it is not particularly limited to this. For example, resistance welding may be used. However, resistance welding requires replacement an electrode that is worn out through repeated welding, because a member to be welded is brought into contact with the electrode. On the other hand, laser welding does not require an electrode to be replaced as it is non-contact welding, and thus the maintenance is easier.

As described above, the method of welding laminated metal foils according to the first embodiment includes the crimping step for crimping the welding point before the welding step. In the crimping step, the laminated metal foils 11 and the metal plates 12 and 13 at the welding point are compressed and deformed. This reduces the number of microscopic gaps between the metal foils in the laminated metal foils 11 and the number of microscopic gaps between the laminated metal foils 11 and the metal plates 12 and 13, thereby more effectively preventing blowholes and spatter from being formed during welding.

Further, there has been a problem in which, when welding is performed without the crimping step, the metal foils constituting the laminated metal foils 11 can easily break at an interface of the welded part 16 when the molten pool 16a solidifies and changes into the welded part 16. This is because the metal foils constituting the laminated metal foils 11 are pulled at the interface of the welded part 16 during solidification and shrinkage. On the other hand, in the method of welding laminated metal foils according to the first embodiment, the metal foils constituting the laminated metal foils 11 are crimped together and integrated by the crimping step. This more effectively prevents the metal foils constituting the laminated metal foils 11 from breaking at the interface of the welded part 16.

<Configuration of Laser Welding Apparatus>

Figure 6:
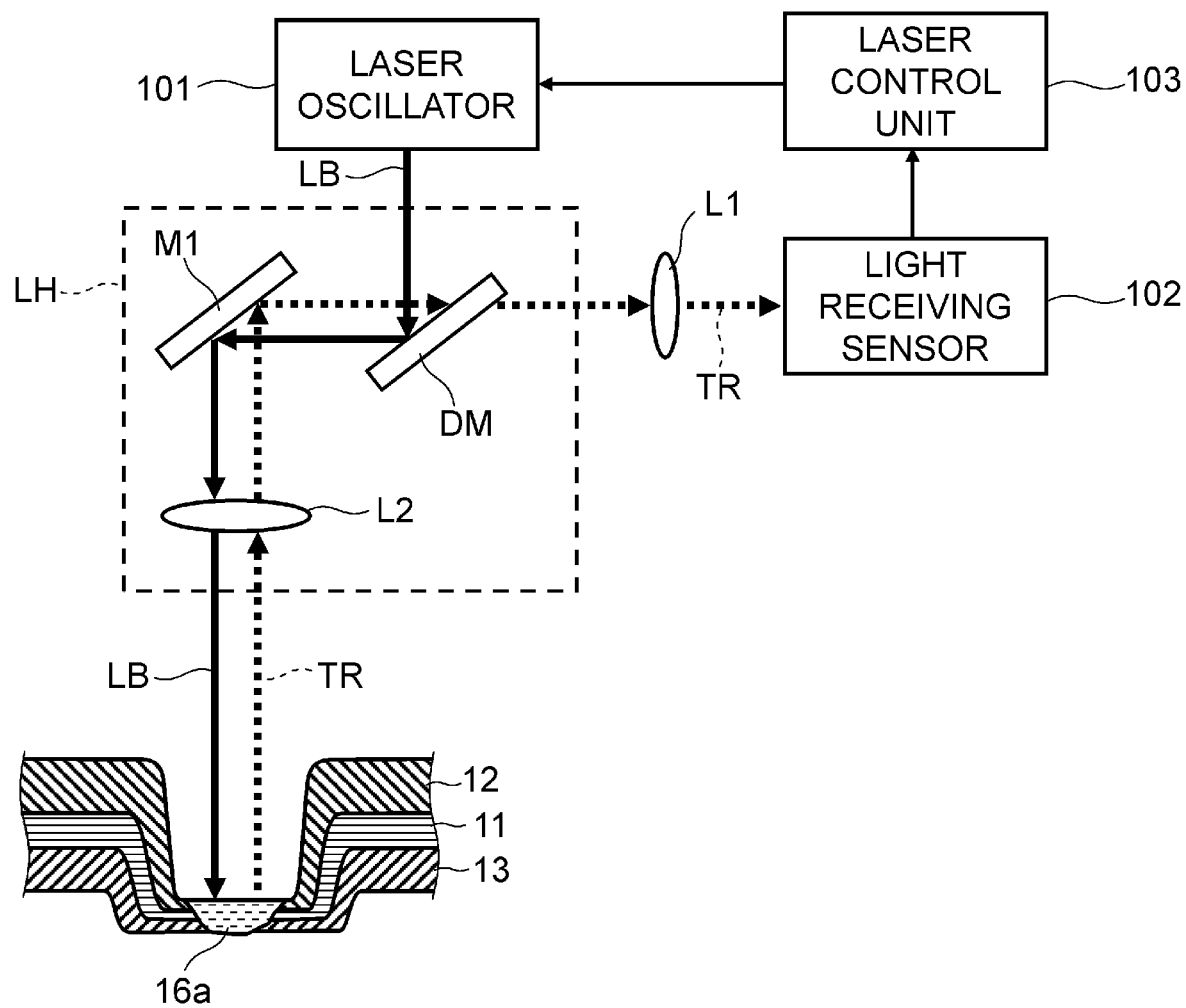
FIG. 6 is a block diagram showing a configuration of a laser welding apparatus used for the method of welding laminated metal foils according to the first embodiment.

Next, a laser welding apparatus used for the method of welding laminated metal foils according to the first embodiment will be described with reference to FIG. 6. FIG. 6 is a block diagram showing a configuration of a laser welding apparatus used for the method of welding laminated metal foils according to the first embodiment.

As shown in FIG. 6, the laser welding apparatus used for the method of laser-welding laminated metal foils according to the first embodiment includes a laser oscillator 101, a laser head LH, a lens L1, a light receiving sensor 102, and a laser control unit 103.

The laser oscillator 101 oscillates the laser beam LB with a laser output based on a control signal output from the laser control unit 103. For example, when a total thickness of the laminated metal foils 11 is about 0.6 to 1.0 mm and the thickness of the metal plates 12 and 13 is about 1.0 to 1.5 mm, the laser output is about 2000 to 3000 W. The laser beam LB output from the laser oscillator 101 is input to the laser head LH.

The laser head LH is, for example, a Galvano scanning laser head capable of scanning. As shown in FIG. 6, the laser head LH includes a dichroic mirror DM, a mirror M1, and a lens L2. The dichroic mirror DM reflects the laser beam LB and transmits thermal radiation light. The laser beam LB is reflected by the dichroic mirror DM and the mirror M1, collected by the lens L2, and then radiated from the laser head LH. The laser beam LB radiated from the laser head LH is projected onto the welding point of the laminated metal foils 11 and the metal plates 12 and 13 to form the molten pool 16a. As an example, when the total thickness of the laminated metal foils 11 is about 0.6 to 1.0 mm and the thickness of the metal plates 12 and 13 is about 1.0 to 1.5 mm, the spot diameter of the laser beam LB projected onto the molten pool 16a is, for example, about 0.6 to 1.0 mm.

More specifically, when spot welding is performed without scanning the laser beam LB, the spot diameter of the laser beam LB is set to about 1.0 mm and the laser beam LB is projected for about 10 to 100 ms. In the case of circular scanning of the laser beam LB, the spot diameter of the laser beam LB is set to about 0.6 mm, which is smaller than that of the spot welding, and the laser beam LB is projected in a circle about 1 to 5 times at a scanning speed of about 20 to 50 mm/s.

In the present laser welding apparatus, the laser output is feedback-controlled based on the received light intensity of thermal radiation light (return light) TR emitted from the molten pool 16a.

Thus, as shown in FIG. 6, the thermal radiation light TR emitted from the molten pool 16a is collected by the lens L1 via the laser head LH and then detected by the light receiving sensor 102. More specifically, in the laser head LH, the thermal radiation light TR is reflected by the mirror M1 via the lens L2, transmitted through the dichroic mirror DM, and then collected by the lens L1.

The higher the temperature of the molten pool 16a irradiated with the laser beam LB, the higher the received light intensity of the thermal radiation light TR detected by the light receiving sensor 102 becomes.

The laser control unit 103 performs feedback control of the laser oscillator 101 based on the received light intensity of the thermal radiation light TR detected by the light receiving sensor 102. Specifically, the laser control unit 103 outputs, to the laser oscillator 101, a control signal for controlling the laser output and the start and stop of the laser oscillation in the laser oscillator 101.

The laser control unit 103 includes a calculation unit such as a CPU (Central Processing Unit), a storage unit such as a RAM (Random Access Memory) that stores various control programs and data and a ROM (Read Only Memory), although they are not shown in the drawings.

Details of the method of controlling the laser welding by the laser control unit 103 will be described below.

<Method of Controlling Laser Welding>

Figure 7:
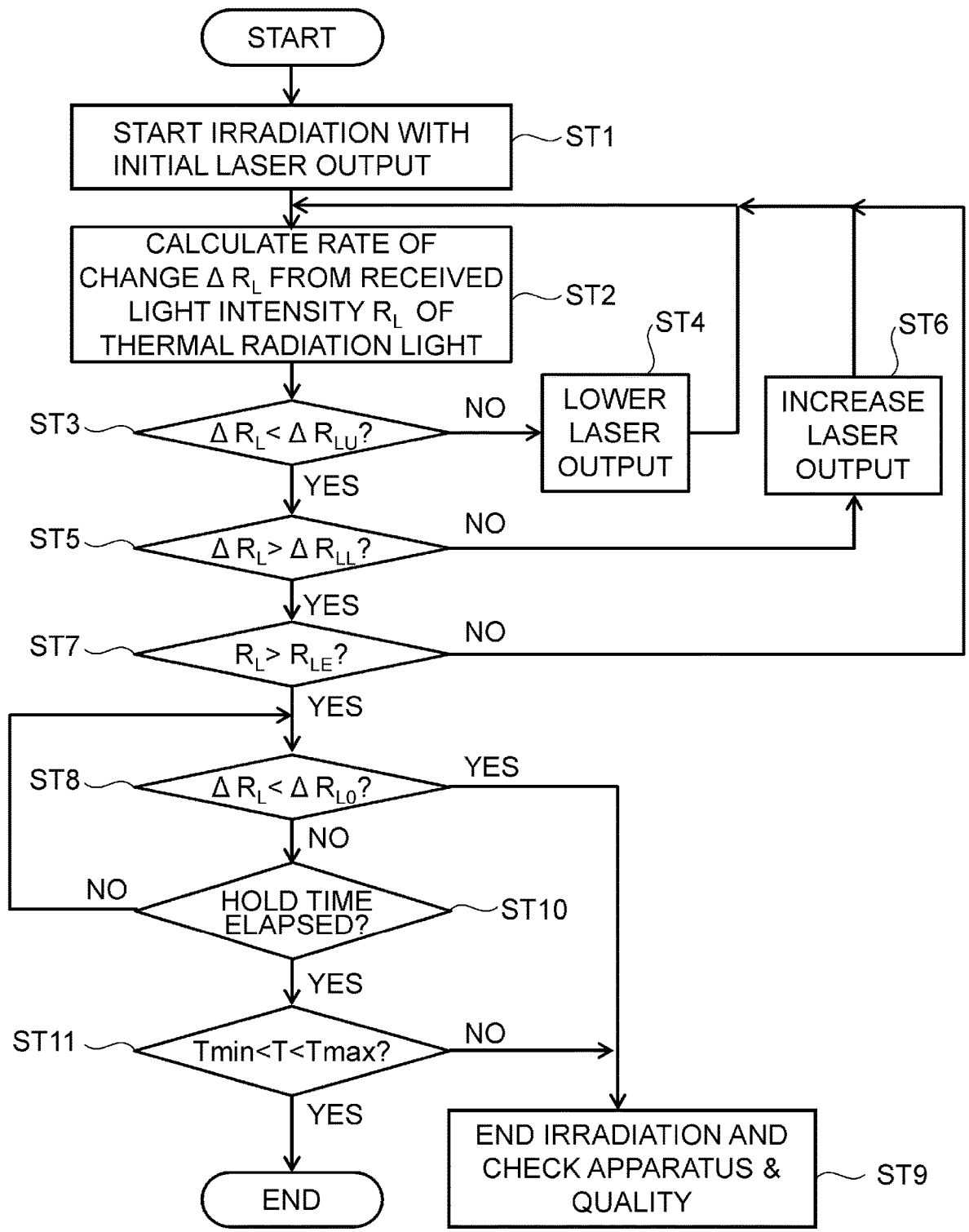
FIG. 7 is a flowchart showing a method of controlling laser welding used in the method of welding laminated metal foils according to the first embodiment.
Figure 8:
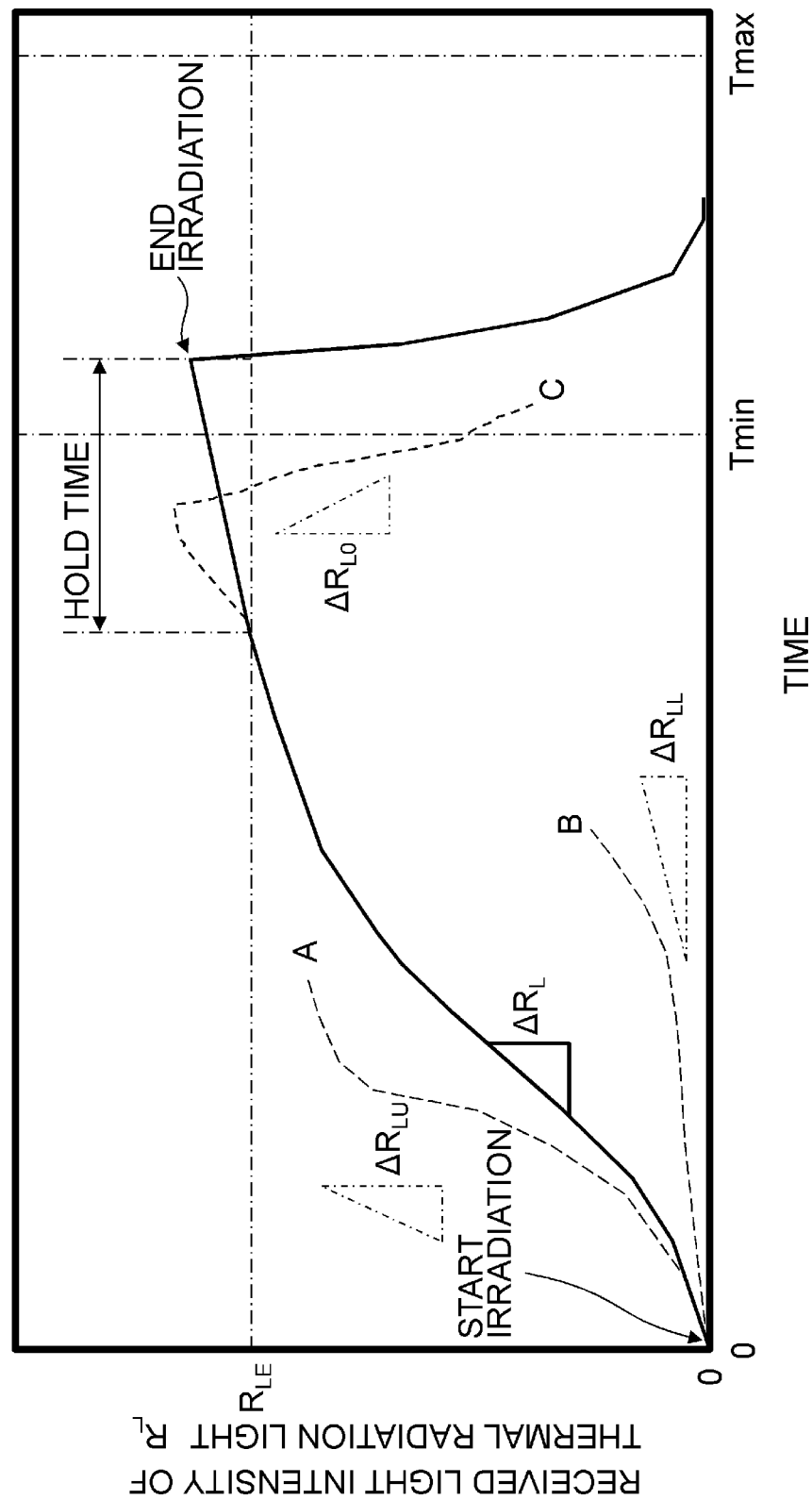
FIG. 8 is a graph showing a temporal change of received light intensity $R_L$ of thermal radiation light in one laser welding.

Hereinafter, a method of controlling the laser welding used in the method of welding laminated metal foils according to the first embodiment will be described with reference to FIGS. 7 and 8. FIG. 7 is a flowchart showing the method of controlling the laser welding used in the method for welding laminated metal foils according to the first embodiment. FIG. 8 is a graph showing the temporal change of the received light intensity $R_L$ of thermal radiation light in one laser welding. The solid curve line in FIG. 8 is a standard temporal change pattern of the received light intensity $R_L$ of the thermal radiation light.

The configuration of the laser welding apparatus shown in FIG. 6 will also be appropriately referred to in the description of the flowchart shown in FIG. 7.

First, as shown in FIG. 7, the laser control unit 103 oscillates the laser oscillator 101 with a predetermined initial laser output, and starts irradiating the laminated metal foils 11 and the metal plates 12 and 13 with the laser beam LB (Step ST1). Then, as shown in the graph of FIG. 8, the received light intensity $R_L$ of the thermal radiation light TR detected by the light receiving sensor 102 starts to rise.

Irradiation conditions other than the laser output are also set before the irradiation of the laser beam LB is started, as a matter of course. For example, the spot diameter and the irradiation time of the laser beam LB are set, and the scanning speed, the number of scans, etc. are set when the laser beam LB is scanned. The settings are stored in, for example, the storage unit of the laser control unit 103.

Next, as shown in FIG. 7, the laser control unit 103 calculates a rate of change $\Delta R_L$ from the received light intensity $R_L$ of the thermal radiation light TR detected by the light receiving sensor 102 (Step ST2). The rate of change $\Delta R_L$ indicates an amount of change in the received light intensity $R_L$ per predetermined time.

Next, the laser control unit 103 determines whether the rate of change $\Delta R_L$ is smaller than an upper limit value $\Delta R_{LU}$ of the predetermined change rate $\Delta R_L$ (Step ST3). The upper limit value $\Delta R_{LU}$ is stored in, for example, the storage unit of the laser control unit 103 before the irradiation of the laser beam LB is started.

When the rate of change $\Delta R_L$ is greater than or equal to the upper limit value $\Delta R_{LU}$ as indicated by the broken curve line A in the graph of FIG. 8 (Step ST3 NO), the laser control unit 103 lowers the laser output so that the rate of change $\Delta R_L$ becomes smaller than the upper limit value $\Delta R_{LU}$ (Step ST4). When the rate of change $\Delta R_L$ is greater than or equal to the upper limit value $\Delta R_{LU}$, the temperature of the molten pool 16a sharply rises, allowing spatter to easily occur and foils to easily break. The breaking of the foils refers to a phenomenon in which the metal foils break at the interface of the welded part 16 when the molten pool 16a is solidified and shrunk. The reduction value in the laser output is stored in, for example, the storage unit of the laser control unit 103 before the irradiation of the laser beam LB is started.

When the rate of change $\Delta R_L$ is smaller than the upper limit value $\Delta R_{LU}$ (Step ST3 YES), the laser control unit 103 does not change the laser output and determines whether the rate of change $\Delta R_L$ is greater than the lower limit value $\Delta R_{LL}$ of the predetermined rate of change $\Delta R_L$ (Step ST5). The lower limit value $\Delta R_{LL}$ is stored in, for example, the storage unit of the laser control unit 103 before the irradiation of the laser beam LB is started.

When the rate of change $\Delta R_L$ is equal to or less than the lower limit value $\Delta R_{LL}$ (Step ST5 NO) as indicated by the broken curve line B in the graph of FIG. 8, the laser control unit 103 increases the laser output so that the rate of change $\Delta R_L$ becomes greater than the lower limit value $\Delta R_{LL}$ (Step ST6). When the rate of change $\Delta R_L$ is equal to or less than the lower limit value $\Delta R_{LL}$, incomplete fusion tends to occur due to insufficient heat input. The increase value in the laser output is stored in, for example, the storage unit of the laser control unit 103 before the irradiation of the laser beam LB is started.

When the rate of change $\Delta R_L$ is greater than the lower limit value $\Delta R_{LL}$ (Step ST5 YES), the laser control unit 103 determines whether the received light intensity $R_L$ exceeds a target value $R_{LE}$ (Step ST7) without changing the laser output. The target value $R_{LE}$ is stored in, for example, the storage unit of the laser control unit 103 before the irradiation of the laser beam LB is started.

When the received light intensity $R_L$ is equal to or less than the target value $R_{LE}$ (Step ST7 NO), as the molten pool 16a is not sufficiently formed yet, the laser control unit 103 returns to Step ST2 without changing the laser output to calculate the rate of change $\Delta R_L$ again from the received light intensity $R_L$ of the thermal radiation light TR detected by the light receiving sensor 102. That is, until the received light intensity $R_L$ exceeds the target value $R_{LE}$ in the graph of FIG. 8, the laser control unit 103 repeats the Steps ST2 to ST7 and controls the laser output in such a way that the relation of the lower limit value $\Delta R_{LL}$<the rate of change $\Delta R_L$<the upper limit value $\Delta R_{LU}$ is satisfied.

When the received light intensity $R_L$ exceeds the target value $R_{LE}$ (Step ST7 YES), as the molten pool 16a has already been sufficiently formed, the laser control unit 103 determines whether the rate of change $\Delta R_L$ is smaller than a penetration reference value $\Delta R_{LD}$, which is a negative value, without changing the laser output (Step ST8). As shown in FIG. 5, the penetration reference value $\Delta R_{LD}$ is a reference value indicating that the molten pool 16a penetrates through the rear surface and is brought into contact with the second recess 52 of the base 50. The penetration reference value $\Delta R_{LD}$ is stored in, for example, the storage unit of the laser control unit 103 before the irradiation of the laser beam LB is started.

When the molten pool 16a is brought into contact with the second recess 52 of the base 50, the received light intensity $R_L$ sharply decreases as indicated by the broken curve line C in the graph of FIG. 8. Thus, the penetration reference value $\Delta R_{LD}$ is a negative value. When the received light intensity $R_L$ exceeds the target value $R_{LE}$, the determination in Step ST8 is preferably performed, because the molten pool 16a could swell and burn-through could occur. When the rate of change $\Delta R_L$ is smaller than the penetration reference value $\Delta R_{LD}$ (Step ST8 YES), the laser control unit 103 ends the irradiation of the laser beam LB and determines that the laser welding apparatus and the quality of the welded part need to be checked (Step ST9). This is because the molten pool 16a swells and is brought into contact with the second recess 52 of the base 50.

When the rate of change $\Delta R_L$ is greater than or equal to the penetration reference value $\Delta R_{LD}$ (Step ST8 NO), as shown in the graph of FIG. 8, the laser control unit 103 determines whether the predetermined hold time has elapsed since the received light intensity $R_L$ exceeded the target value $R_{LE}$ (Step ST10). The hold time is stored in, for example, the storage unit of the laser control unit 103 before the irradiation of the laser beam LB is started.

When the hold time has not elapsed (Step ST10 NO), the laser control unit 103 returns to Step ST8 to determine again whether the updated rate of change $\Delta R_L$ is smaller than the penetration reference value $\Delta R_{LO}$. That is, the laser control unit 103 repeats Step ST8 until the hold time elapses in the graph of FIG. 8.

When the hold time has elapsed (Step ST10 YES), the laser control unit 103 determines whether the relation of the lower limit value Tmin<irradiation time T<upper limit value Tmax shown in the graph of FIG. 8 is satisfied in regard to the irradiation time T of the laser beam LB (Step ST11). The lower limit value Tmin and the upper limit value Tmax are stored in, for example, the storage unit of the laser control unit 103 before the irradiation of the laser beam LB is started.

When the relation of the lower limit value Tmin<irradiation time T<upper limit value Tmax is not satisfied (Step ST11 NO), the laser control unit 103 ends the irradiation of the laser beam LB and determines that the laser welding apparatus and the quality of the welded part need to be checked (Step ST9). This is because when the irradiation time T is equal to or less than the lower limit Tmin, the irradiation time is too short, while when the irradiation time T is equal to or longer than the upper limit Tmax, the irradiation time is too long, and thus some kind of an abnormality may be occurring.

When the relation of the lower limit value Tmin<irradiation time T<upper limit value Tmax is satisfied (Step ST11 YES), the laser control unit 103 determines that the welding is successfully completed, and ends the irradiation of the laser beam LB.

As described above, the feedback control of the laser output using the received light intensity $R_L$ of the thermal radiation light TR detected by the light receiving sensor 102 can improve the quality of the welded part 16. In particular, detection of a sharp decrease in the received light intensity $R_L$ due to the contact between the molten pool 16a and the second recess 52 more effectively prevents burn-through caused by swelling of the molten pool 16a.

In the example shown in FIG. 7, the laser output is feedback-controlled as the irradiation condition of the laser beam LB, but other irradiation conditions such as the irradiation time may be feedback-controlled.

Second Embodiment

Figure 9:
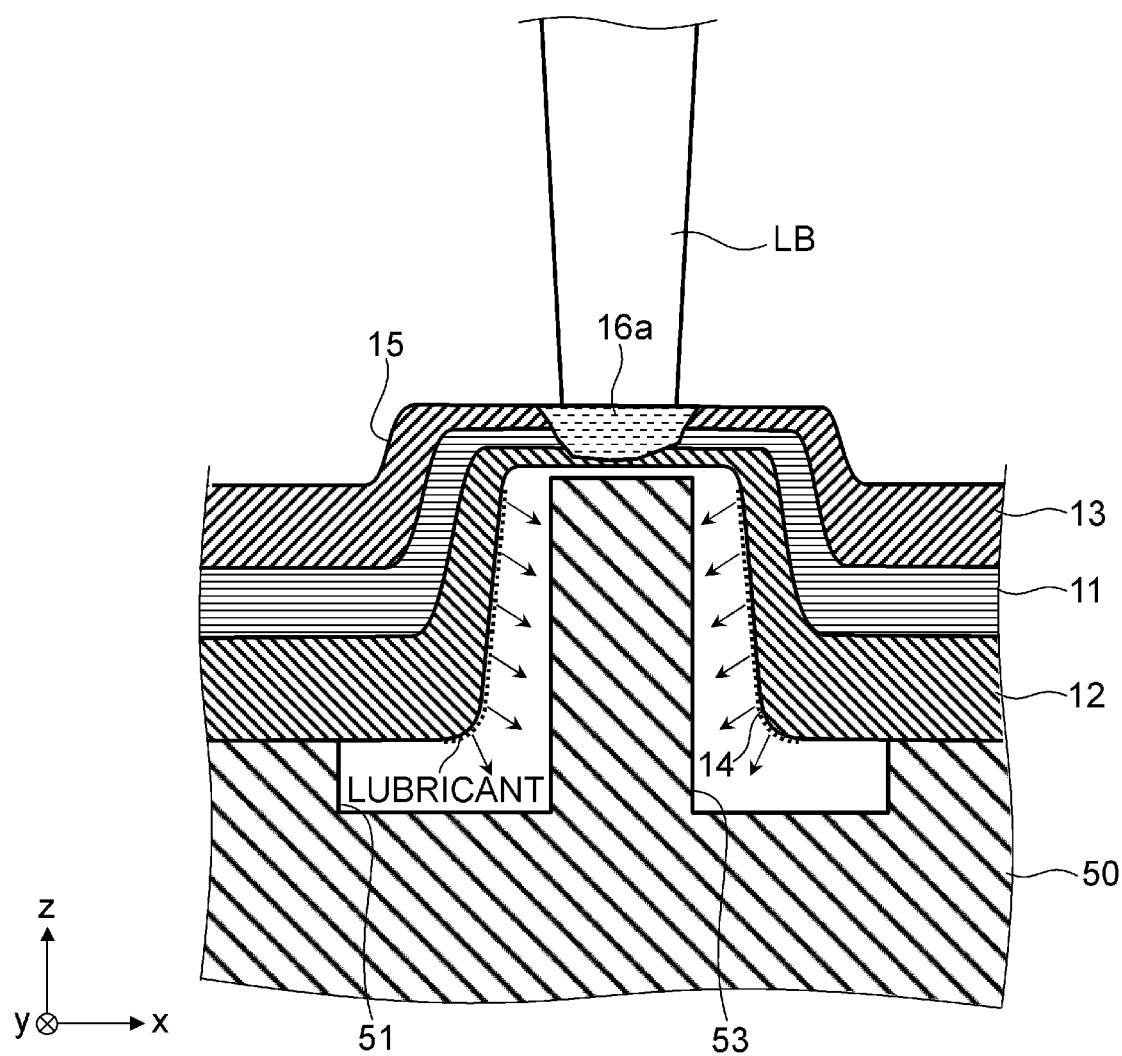
FIG. 9 is a cross-sectional view showing a welding step in a method of welding laminated metal foils according to a second embodiment.

Next, a method of welding laminated metal foils according to a second embodiment will be described with reference to FIG. 9. FIG. 9 is a cross-sectional view showing a welding step in the method of welding laminated metal foils according to the second embodiment. In the method of welding laminated metal foils according to the first embodiment shown in FIG. 4, the metal plate 12 is positioned on the upper side (the z axis positive direction side), the metal plate 13 is positioned on the lower side (the z axis negative direction side), and then the laminated metal foils 11 are placed on the base 50. On the other hand, in the method of welding laminated metal foils according to the second embodiment, as shown in FIG. 9, the metal plate 13 is positioned on the upper side, the metal plate 12 is positioned on the lower side, and then the laminated metal foils 11 are placed on the base 50.

As shown in FIG. 9, a cylindrical projection 53 to be inserted into the recess 14 formed in the crimping step is formed at the central part of the first recess 51 on the upper surface of the base 50 that supports the lower surface of the metal plate 12. Then, the top surface of the projection 15 of the metal plate 13 formed in the crimping step is irradiated with the laser beam LB from above. The above-mentioned projection 53 of the base 50 is formed so that it is positioned right under the molten pool 16a formed by the irradiation of the laser beam LB. By detecting the contact of the molten pool 16a with the projection 53, burn-through caused by swelling of the molten pool 16a can be more effectively prevented.

Like the method of welding laminated metal foils according to the first embodiment, the method of welding laminated metal foils according to the second embodiment also includes a crimping step for crimping the welding point before the welding step. In the crimping step, the laminated metal foils 11 and the metal plates 12 and 13 are compressed and deformed at the welding point. This reduces the number of microscopic gaps between the metal foils in the laminated metal foils 11 and the number of microscopic gaps between the laminated metal foils 11 and the metal plates 12 and 13, thereby more effectively preventing blowholes and spatter from being formed during welding.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of welding laminated metal foils sandwiched between a pair of metal plates to the pair of metal plates, the method comprising:
    locally pressing and crimping the laminated metal foils sandwiched between the pair of metal plates at a welding point in a laminating direction; and
    welding the crimped pair of metal plates and laminated metal foils at the welding point,
    wherein during crimping, a thickness of the crimped laminated metal foils is made 50% or less of a thickness of the laminated metal foils before crimping; and
    wherein in the welding:
        the welding point is irradiated with a laser beam to be welded and an irradiation condition of the laser beam is feedback-controlled based on intensity of thermal radiation light emitted from a molten pool formed by the irradiation of the laser beam;
        contact of the molten pool with a base on which the pair of metal plates and the laminated metal foils are placed is detected based on the intensity of the thermal radiation light; and
        when the contact of the molten pool with the base is detected, the irradiation of the molten pool with the laser beam is ended.

2. The method according to claim 1, wherein mechanical clinching is employed as the crimping method.

3. The method according to claim 1, wherein the laminated metal foils and the metal plates are deformed into U-shaped cross sections.

* * * * *